United States Patent [19]

Vogel

[11] 4,094,426

[45] June 13, 1978

[54] APPARATUS FOR IMPARTING INDEPENDENT ROTATIONAL AND TRANSLATIONAL MOVEMENT

[75] Inventor: Charles A. Vogel, Effingham, Ill.

[73] Assignee: Fedders Corporation, Edison, N.J.

[21] Appl. No.: 807,165

[22] Filed: Jun. 16, 1977

[51] Int. Cl.² ............................................. B65H 51/10
[52] U.S. Cl. ...................................................... 214/338
[58] Field of Search .............................. 214/1 Q, 338; 51/103 TF

[56] References Cited

U.S. PATENT DOCUMENTS

| 2,429,201 | 10/1947 | Connor et al. | 214/338 |
| 3,517,844 | 6/1970 | Wloszek | 214/338 |

FOREIGN PATENT DOCUMENTS

| 1,228,909 | 3/1960 | France | 214/338 |

Primary Examiner—Robert G. Sheridan
Attorney, Agent, or Firm—McAulay, Fields, Fisher & Goldstein

[57] ABSTRACT

Independent rotational and translational movement imparting apparatus is provided to move a workpiece along its axis and to rotate it about its own axis. The apparatus includes two separate timing mechanisms which are interconnected with a common mechanism to impart movement to the workpiece. The common mechanism includes an interconnecting gear arrangement which is responsive to impart translatory movement or rotary movement, each independent of the other and each separately controlled.

9 Claims, 5 Drawing Figures

APPARATUS FOR IMPARTING INDEPENDENT ROTATIONAL AND TRANSLATIONAL MOVEMENT

BACKGROUND OF THE INVENTION

This invention relates to an apparatus for imparting independent rotational and axial movement to a workpiece.

More specifically, the invention provides for independent rotational incremental movement and translational incremental movement to tubular members or the like, particularly when work is to be done on the tubular member, or another member such as a fin structure is to be applied to the tubular member. The tubular member does not have to be round in cross-section and may be either hollow or solid.

By providing for independent translational and rotational movement of the workpiece, a more accurate control of the incremental and total movement of the workpiece is obtained. Moreover, for the sake of accuracy and precise movement, it is important that the translation movement imparted to the workpiece is not affected by and does not affect the rotational movement of the workpiece, and vice-versa.

Apparatus and mechanisms for imparting both rotational and translational movement to a workpiece are known. However, such apparatus do not provide for separate and independent incremental rotational and translational movement without one type of movement affecting the other. Specifically, with the heretofore known apparatus, rotational and incremental movement can be imparted to a workpiece, but one type of movement affects the other. Hence, the net translational or rotational movement of the workpiece is dependent upon the amount of separate translational and separate rotational movement imparted to the workpiece.

In the heretofore known apparatus which includes both means for imparting translational movement and means for imparting rotational movement, the net translational movement will vary in accordance with the amount of rotational movement imparted to the workpiece. Therefore, if a predetermined amount of translational movement is imparted, the workpiece will advance translationally different amounts in accordance with the amount of and direction of rotational movement imparted to the workpiece. In a similar manner, when rotational movement is imparted to the workpiece, the amount of angular rotation imparted to the workpiece is dependent not only on the rotational movement, but on the amount and direction of the translational movement imparted.

One example of an apparatus for moving a workpiece both translationally and rotationally is set forth in Connor et al, U.S. Pat. No. 2,429,201. Connor et al provides for two gears, a casing gear and a sun gear which are interrelated. By rotating the casing gear and the sun gear at the same speed and in the same direction, the workpiece-bar will be rotated, but the bar will not be moved translationally. In order to obtain translational movement of the bar, it is necessary to rotate the casing gear and the sun gear at different speeds. The relationship between the rotational movement and the translational is determined and varied by adjusting the relative speeds of rotation imparted to the casing gear and the sun gear. Therefore, the rate and direction of feed as well as direction of rotation of the tube are all interrelated and dependent upon the relative speeds and direction of rotation of the casing and the sun gear.

Another example of an apparatus for moving a workpiece both rotationally and translationally is set forth in Wolszek, U.S. Pat. No. 3,517,844. Wolszek shows the use of two drive belts to control the rotation and translational advancement of a workpiece. One belt drives a housing and another belt drives a sleeve. The housing and the sleeve are geared to work together as a unit in order to rotate and move a workpiece translationally. Movement of the workpiece whether rotational, translational or both is dependent on the speed of rotation of the housing and the sleeve. When the speed of rotation of the housing and the sleeve are the same, the workpiece rotates with no translational movement. When the housing is rotated and the sleeve is stopped, the workpiece is moved transltionally and rotated. Hence, rotational and translational movement of the workpiece is dependent on two movements which are not independent of each other.

BRIEF DESCRIPTION OF THE INVENTION

In accordance with the present invention, an improved apparatus for moving a workpiece has been developed. The apparatus in accordance with the invention includes separate means for rotating a workpiece and separate means for imparting translational movement to the same workpiece. Both the means for rotating the workpiece and the means for translatably moving the workpiece operate on the same workpiece moving mechanism. Accordingly, with the present invention it is possible to impart precise and incremental translatory and rotational movements without one affecting or controlling the other.

According to one aspect of the invention, two sets of drive rollers are provided, both of which are used to grip the workpiece to move the workpiece. Both sets of drive rollers work in unison either to rotate the workpiece, move the workpiece in translation or longitudinally along its axis, or both to move the workpiece longitudinally and rotate it at the same time. The two sets of rollers can rotate the workpiece in either direction about its axis and/or move the workpiece longitudinally along its axis in either direction.

The apparatus according to the invention provides for two separate timing means in the form of timing belts. Both timing belts coact on the same two sets of drive rollers. One timing belt is used to impart solely rotational movement to the workpiece, and the other timing belt is used to impart solely translational or longitudinal movement to the workpiece. Each timing belt affects the two pairs of drive rolls independently of each other.

The apparatus according to the invention also includes common means intercoupling both separate timing means to provide a resultant motion to the workpiece which is a summation of the two separate movements imparted to the two sets of drive rollers. The common means is separately controlled by each of the two individual timing means. The common means includes common gearing on both of the sets of drive rollers. The common gearing interconnects the two timing means with each other so that both sets of drive rollers are rotated and revolved in response to the workpiece to the timing means to rotate and the timing means to move the workpiece longitudinally. The common gearing is controlled by the timing means to move the workpiece longitudinally and by the timing means to rotate the workpiece. The control imparted by longitudinal movement imparting timing means is independent of the control imparted by the rotational movement imparting timing means.

BRIEF DESCRIPTION OF THE DRAWINGS

Figure 1:
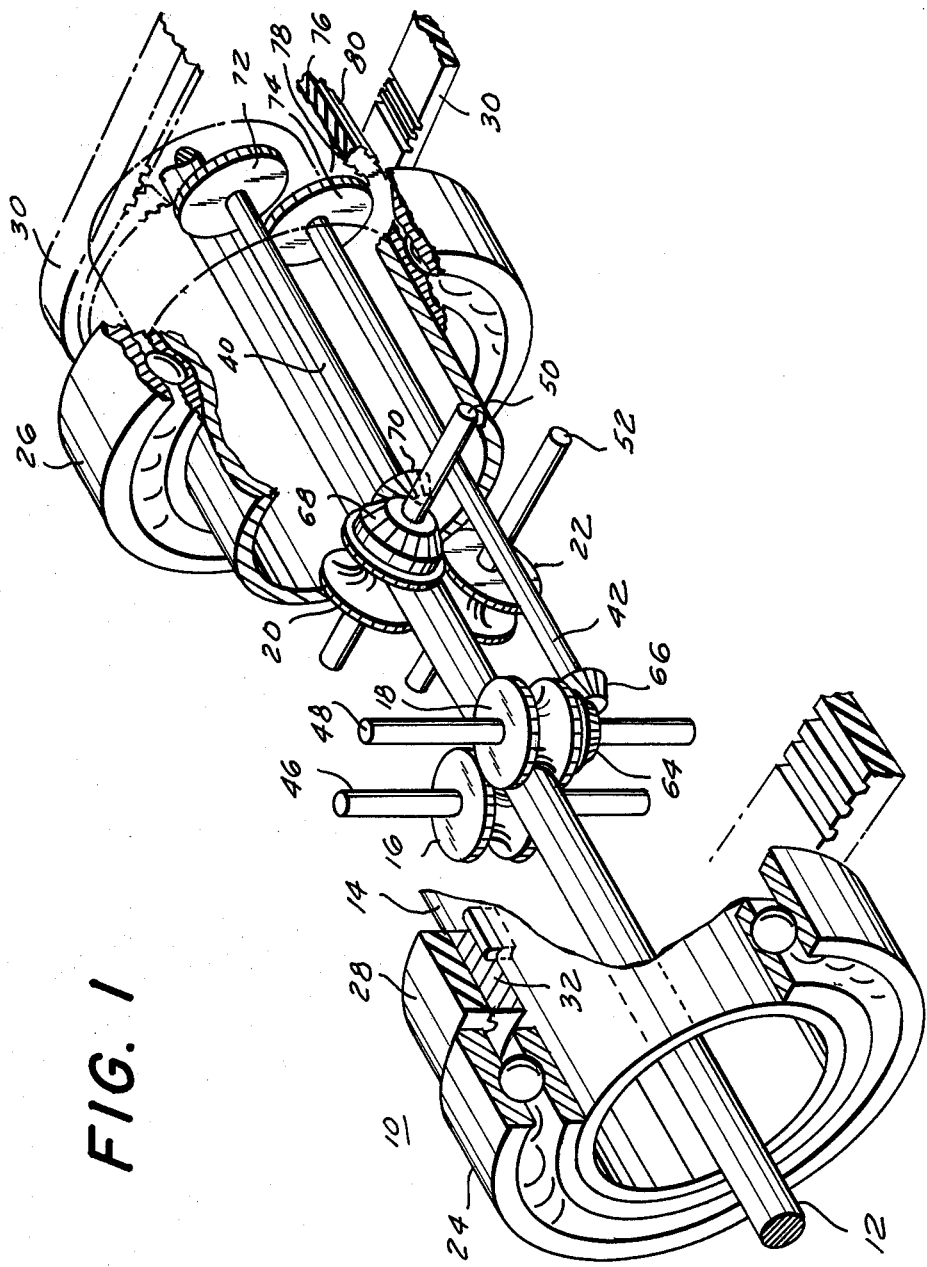
Figure 2:
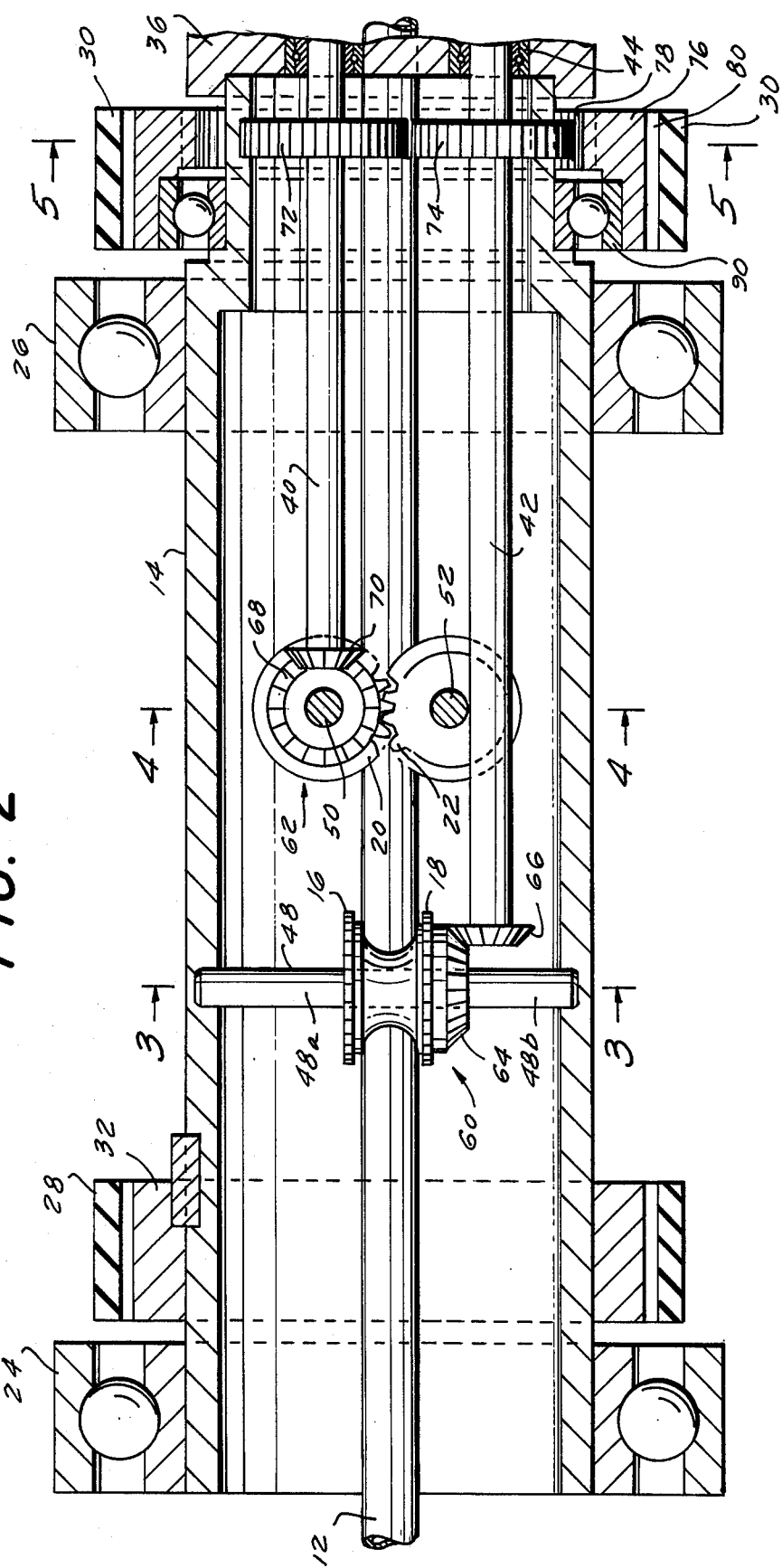
Figure 3:
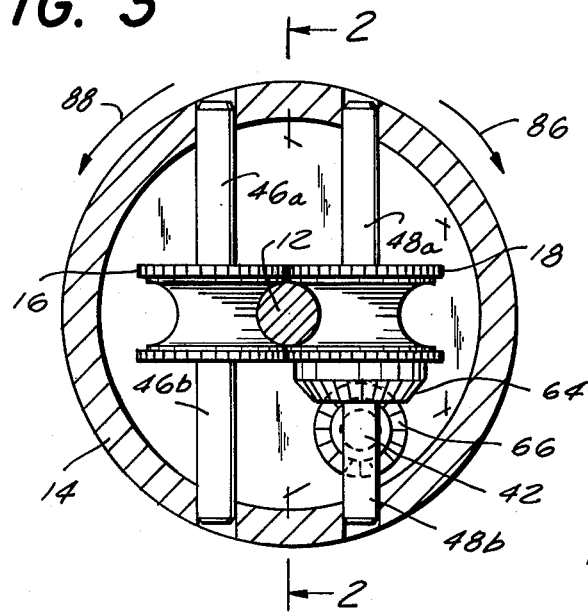
Figure 4:
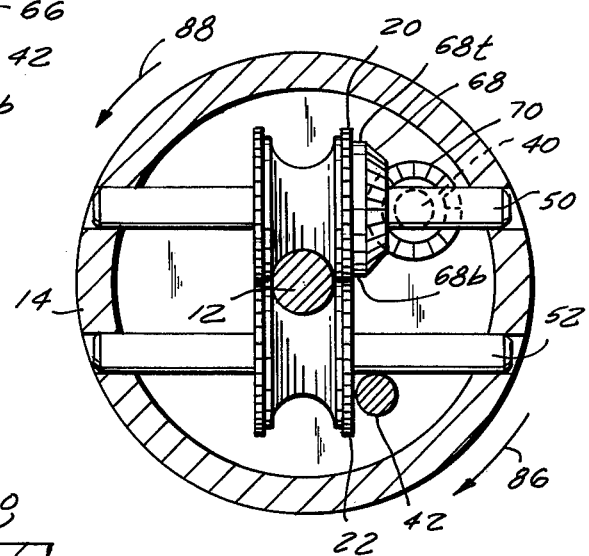
Figure 5:
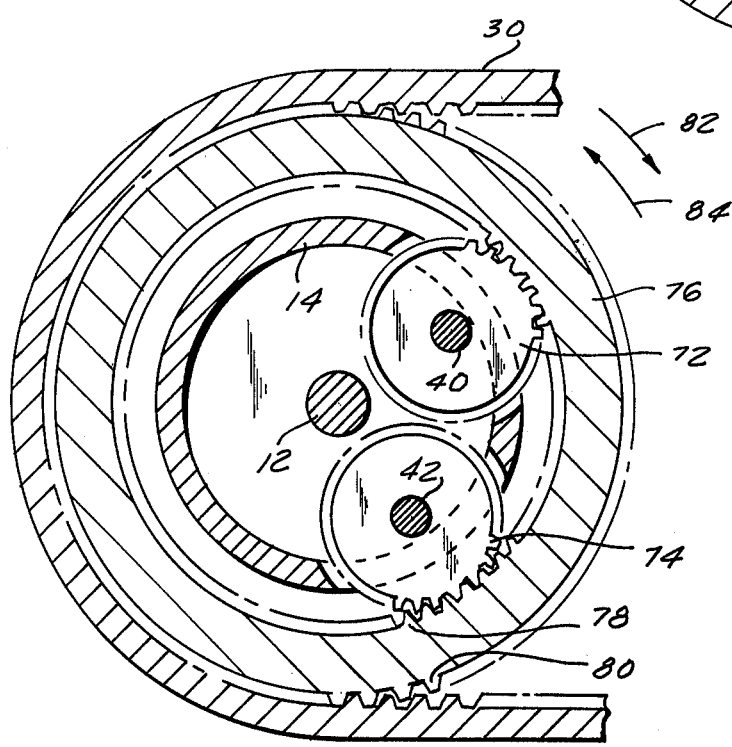

IN THE DRAWINGS:

FIG. 1 is a perspective view of the apparatus according to the invention with parts broken away for ease of illustration in which one of the timing belts has been omitted, and the workpiece is shown in the apparatus;

FIG. 2 is a vertical sectional view taken through the central axis of the apparatus with the workpiece shown in full outline;

FIG. 3 is a sectional view taken on line 3—3 of FIG. 2;

FIG. 4 is a sectional view taken on line 4—4 of FIG. 2; and,

FIG. 5 is a sectional view taken on line 5—5 of FIG. 2.

DESCRIPTION OF THE PREFERRED EMBODIMENT

Referring now more particularly to FIG. 1, workpiece conveyor apparatus 10 to convey a workpiece 12 includes an outer rotable spindle 14, a first pair of workpiece conveyor rollers 16, 18 and a second pair of conveyor rollers 20, 22 between which workpiece 12 is held for rotational and translational movement. Spindle 14 is held between a pair of conventional rotational bearings 24, 26. Apparatus 10 includes a pair of timing belts 28, 30 to impart rotational and longitudinal movement to workpiece 12. Both of the timing belts are toothed and are equivalent to geared timing belts.

Timing belt 28 cooperates with ring 32 which is keyed to the outer peripheral surface of spindle 14. Ring 32 is provided with outer teeth complementary to the teeth of the timing belt 28 so as to mesh with the teeth of timing belt 28. Solely rotational movement about the axis of workpiece 12 and the central axis of apparatus 10 is imparted to workpiece 12 by belt 28. Timing belt 30 imparts solely translational or longitudinal movement to workpiece 12 along the central axis thereof without imparting any movement to or affecting spindle 14.

Referring now more particularly to FIG. 2, spindle 14 is open at its left end and is provided with a wall 36 transverse to its central axis. Wall 36 is provided with an opening through which workpiece 12 is fed between rollers 16, 18 and 20, 22. Wall 36 includes rotatable bearings to hold longitudinal shafts 40, 42 axially aligned with the central axis of spindle 14 but spaced therefrom. Spindle 14 supports on the interior thereof shafts 46 and 48 for rollers 16 and 18, respectively, and shafts 50 and 52 for rollers 20 and 22, respectively. Shafts 46, 48, 50 and 52 are held by spindle 14 and fixed for movement with spindle 14, but are free to rotate about their own axes in suitable bearings on the interior of spindle 14 relative thereto. Shafts 46 and 48 are parallel to each other, and shafts 50 and 52 are parallel to each other and angularly displaced relative to shafts 46 and 48.

While shafts 46, 48 and 50, 52 are shown as orthogonally related to each other, they are preferably displaced from each other and not aligned. Also, while the shafts are shown extending from one side of the central axis of spindle 14 across to the other, they need only be held in one side of spindle 14. Moreover, while the shafts 46, 48 and 50, 52 and their rollers 16, 18 and 20, 22 are shown axially displaced from each other, they need not be, and the axes of the shafts can all lie in the same plane if they are only held at one end thereof to spindle 14. As an example, and as best seen in FIG. 3, shaft 46 may be formed of two stub shafts 46a and 46b, and shaft 48 may also be formed of two stub shafts 48a and 48b. Should it be desired to avoid the use of stub shafts, shafts 46, 48 and shafts 50, 52 may be displace from each other axially along the axis of spindle 14.

Both of the timing belts 28, 30 cooperate with a common mechanism for imparting translational and rotational movement to workpiece 12 and include a first set of bevel gears 60 and a second set of bevel gears 62 as well as the first and second pairs of rollers. First set of bevel gears 60 includes a first bevel wheel 64 fixed for rotation on shaft 48 (or 48b) and a second bevel wheel 66 fixed for rotation with shaft 42. Second set of bevel gears 62 includes a first bevel wheel 68 fixed to shaft 50 for rotation therewith and a second bevel wheel 70 fixed to shaft 40 for rotation therewith. Bearings 26 are effective to maintain shafts 40 and 42 in their desired positions to assure that bevel wheels 64, 66 mesh with each other and that bevel wheels 68, 70 mesh with each other. While bevel sets 60 and 62 are shown, it is possible to use hypoid gears. The use of hypoid gears is advisable where it is desired to avoid the use of stub shafts in order to avoid displacement of rollers 16, 18 from rollers 20, 22 because of space requirements.

Shafts 40 and 42 are positioned on opposite sides of a horizontal plane passing through the central axis of spindle 14 and workpiece 12, and carry spur gears 72 and 74, respectively, which are adapted to be driven by the second timing belt 30 in order to drive bevel wheels 62 and 64. While rotatable bearings 44 are sufficient to align shafts 40 and 42 properly, it may be desirable to provide the shafts with a further support. For this purpose, annular or ring gear 76 having inner teeth 78 and outer teeth 80 is provided. Outer teeth 80 are engaged by the teeth of the second timing belt 30 and inner teeth 78 mesh with the teeth on gears 72, 74 which form planetary gears revolving around workpiece 12 but spaced therefrom. If annular gear 76 is not used, then the teeth of timing belt 30 mesh directly with the teeth of gears 72, 74 to drive them. Annular gear 76 is also free to rotate relative to spindle 26. Bearing 90 which is fixed to spindle 26 and annular gear 76 permits relative rotational movement between spindle 26 and timing belt 30.

Spatially, shafts 40, 42 and bevel wheels 66 and 70 are spaced from workpiece 12 and the area thereof so that no interference takes place.

Spindle 14, through the connection of shafts 46, 48 to rollers 16, 18, respectively, and through the connection of shafts 50, 52 to rollers 20, 22, respectively, is effective to revolve the rollers about the central axis of the spindle while permitting the rollers to be rotated about their individual axis.

In order to compensate for differences in diameter of the workpiece, the teeth of the bevel wheels or gears 64, 66, 68 and 70 are made deep.

DESCRIPTION OF OPERATION

Timing belts 28 and 30 operate independently of each other, and while they interact to produce a sum total of rotation and axial movement to the workpiece 12, one timing belt does not have to be varied to take into consideration the action of the other.

Timing belt 28 imparts rotary movement and timing belt 30 imparts translatory movement of workpiece 12 axially of spindle 14. As a first condition, it will be assumed that timing belt 28 is inoperative and timing belt 30 is operative. Hence, no rotational movement is imparted to workpiece 12. Rotation of timing belt 30 in a clockwise direction as indicated by arrow 82 in FIG. 5, causes gears 72 and 74 to rotate in a clockwise direction as well as shafts 40 and 42. Bevel wheels 66 and 70 also rotate in a clockwise direction. Rotation of bevel wheel 66 clockwise causes bevel wheel 64 to rotate in a counterclockwise direction as viewed in FIG. 1 to move workpiece 12 to the right as viewed in FIG. 1.

As viewed in FIG. 4, bevel wheel 68 has a top portion 68*t* and a bottom portion 68*b*. Top portion 68*t* moves out of the plane of the paper to cause the second pair of rollers to move workpiece 12 into the plane of the paper. Similarly, bevel wheel 64 has a right side portion 64*r* and a left side portion 64-1 as viewed in FIG. 3. Portion 64*r* moves out of the plane of the paper and portion 64-1 moves into the plane of the paper to rotate the first pair of rollers to move workpiece 12 into the plane of the paper as viewed in FIG. 2 or to the right as viewed in FIG. 1.

Rotation of timing belt 30 counterclockwise in the direction of arrow 84 causes workpiece 12 to move to the left as viewed in FIG. 1 or into the plane of the paper as viewed in FIGS. 3, 4 and 5. The first and second pair of rollers are designed for the workpiece 12 so that it is nipped and moved axially as the rollers are moved.

When timing belt 30 is inactive and imparts no motion to gears 72, 74, and timing belt 28 rotates spindle 14 in the direction of arrow 86 to rotate spindle 14 in a clockwise direction as viewed in FIGS. 3, 4 and 5, workpiece 12 is rotated in a clockwise direction. Similarly, when timing belt 28 rotates spindle 14 in a counterclockwise direction as indicated by arrow 88, workpiece 12 is rotated in a counterclockwise direction. The rotation of spindle 14 has no effect on the translatory movement of workpiece 12.

The axes of bevel gears 64 and 68 are transverse to each other, and can intersect if stub shafts are used and it is desired that they be in the same plane. The axes of bevel gears 66 and 70 are parallel to each other as well as to the direction of translatory movement of workpiece 12.

Assuming that only timing belt 28 is moved to rotate spindle 14 in the direction of arrow 86 and rotate workpiece 12, then bevel wheel 64 rotates about bevel wheel 66 which is fixed because timing belt 30 is stationary. Bevel wheel 64 rotates rollers 16 and 18 about their own axes to tend to move workpiece 12 to the right as viewed in FIGS. 1 and 2. Stub shaft 48*b* effectively moves into the plane of the paper in FIG. 2 and stub shaft 49*a* moves out of the plane of the paper. In a similar manner, bevel wheel 68 rotates in a clockwise direction as viewed in FIG. 2 to tend to move workpiece 12 to the left as viewed in FIGS. 1 and 2. Since workpiece 12 is gripped with the same tension between rollers 16, 18, and 20, 22, no translatory movement takes place. When spindle 14 is rotated in a counterclockwise direction, in the direction of arrow 88, and timing belt 30 is stationary, then rollers 16, 18 tend to move workpiece 12 to the left and rollers 20, 22 tend to move workpiece 12 to the right, with each movement cancelling the other out.

It will be noted that tangent lines to both sets of rollers move in the same direction in response to timing belt 30, and that the tangent lines to rollers 16, 18 move in a direction opposite to the tangent lines to rollers 20, 22 in response to timing belt 28, and any net axial movement is imparted solely by timing belt 30.

While there has been shown what is considered to be a preferred embodiment, it is obvious that various changes and modifications may be made without departing from the scope of the invention.

I claim:

1. Apparatus for imparting independent rotational and axial movements to a workpiece and combining such movements, including
   (a) first means to impart rotational movement to the workpiece in a first direction and rotational movement to the workpiece in a second direction opposite to said first direction;
   (b) second means to impart axial movement to the workpiece in a first axial direction transverse to the direction of rotation of the workpiece and in a second axial direction opposite to said first axial direction;
   (c) first timing means for said first means to control the rate of rotation of the workpiece;
   (d) second timing means independent of said first timing means to control the rate of axial movement of the workpiece; and,
   (e) common means intercoupling said first and said second means and responsive thereto for simultaneously imparting the rotational and the axial movement to the workpiece, said common means being independently controlled by said first and said second means for independent axial and rotational movement of the workpiece.

2. Apparatus for imparting independent rotational and axial movements to a workpiece and combining such movements, including
   (a) first means to impart rotational movement to the workpiece in a first direction and rotational movement to the workpiece in a second direction opposite to said first direction;
   (b) second means to impart axial movement to the workpiece in a first axial direction transverse to the direction of rotation of the workpiece and in a second axial direction opposite to said first axial direction;
   (c) first timing means for said first means to control the rate of rotation of the workpiece;
   (d) second timing means independent of said first timing means to control the rate of axial movement of the workpiece; and,
   (e) common means intercoupling said first and said second means and responsive thereto for simultaneously imparting the rotational and the axial movement to the workpiece, said common means being independently controlled by said first and said second means for independent axial and rotational movement of the workpiece,
   said common means including
   a first pair of rollers positioned on opposite sides of a central axis to grip and to move the workpiece, and first connecting means connecting said first pair of rollers with said first means to revolve said first pair of rollers about the central axis;
   a second pair of rollers displaced from said first pair of rollers and positioned on opposite sides of the central axis, and second connecting means connecting said second pair of rollers with said first means to revolve said second pair of rollers about the central axis;

a first pair of cooperating bevel gears operatively connected with said first and said second means, one of said first pair of bevel gears being directly connected with one of said first pair of rollers, and the other of said first pair of bevel gears being connected with said second means to rotate said one of said first pair of rollers about their own first common axis;

a second pair of cooperating bevel gears operatively connected with said first and said second means, one of said second pair of bevel gears being directly connected with one of said second pair of rollers, and the other of said second pair of bevel gears being connected with said second means to rotate said one of said second pair of rollers about their own second common axis, and the first and second common axes being angularly displaced from each other about said central axis and transverse thereto; and, the axes of said one of said first and said second pair of bevel gears being transverse to each other, and the axes of said other of said first and said second pair of bevel gears being parallel to each other and to the central axis such that tangent lines to said first and said second pairs of rollers move in the same direction in response to said second means and tangent lines to said first pair of rollers move in an opposite direction to tangent lines to said second pair of rollers by the same amount in response to said first means.

3. Apparatus as set forth in claim 2, wherein said first means includes:
   (a) a rotatable spindle;
   (b) a first pair of shafts, one of said shafts being fixedly connected with said one of said first pair of bevel gears, the other of said shafts being fixedly connected with the other of said first pair of rollers, and one end of each said shafts being held by said spindle for rotation therewith but free for rotation about is own axis; and,
   (c) a second pair of shafts, one of said second pair of shafts being connected with said one of said other pair of rollers and said one of said second pair of bevel gears, the other of said second pair of shafts being connected with the other of said second pair of rollers, and one end of each of said second pair of shafts being held by said spindle for rotation therewith but free for rotation about its own axis.

4. Apparatus as set forth in claim 3, wherein said first timing means includes:
   (a) a timing belt having teeth thereon; and,
   (b) a gear member fixed to said spindle; and wherein the teeth of said timing belt mesh with the teeth of said gear member to impart rotary movement to said spindle.

5. Apparatus as set forth in claim 2, wherein said second means includes:
   (a) first and second rotatable shafts parallel to the central axis, means holding one end of each said shafts to said first means for rotation therewith but free for rotation about their own axis, said last-mentioned means positioning said shafts on opposite sides of a horizontal plane passing through the central axis and between said pairs of bevel gears; and the other end of each said shafts being connected with said other of said first and said second pairs of bevel gears, respectively; and
   (b) a spur gear fixed to each said shaft for rotating said shafts and said other bevel gears.

6. Apparatus as set forth in claim 5, wherein said second timing means includes:
   (a) a timing belt having teeth thereon; and,
   (b) ball-bearing means rotatably coupling said timing belt to said first means but free of any rotatable connection therewith; and, wherein said teeth of said timing belt mesh with the teeth of said spur gears for rotation thereof and said bevel gears.

7. Apparatus as set forth in claim 6, wherein the teeth of said bevel gears are deep to compensate for differences in diameter of the workpiece.

8. Apparatus as set forth in claim 5, wherein said second timing means includes:
   (a) a timing belt having teeth thereon; and,
   (b) a ring gear having inner and outer teeth; said inner teeth meshing with the teeth of said spur gears, and said outer teeth meshing with the teeth of said timing belt for rotation of said spur gears by said timing belt.

9. Apparatus for imparting independent rotational and axial movements to a workpiece and combining such movements, including
   (a) first means to impart rotational movement to the workpiece in a first direction and rotational movement to the workpiece in a second direction opposite to said first direction;
   (b) second means to impart axial movement to the workpiece in a first axial direction transverse to the direction of rotation of the workpiece and in a second axial direction opposite to said first axial direction;
   (c) first timing means for said first means to control the rate of rotation of the workpiece;
   (d) second timing means independent of said first timing means to control the rate of axial movement of the workpiece; and,
   (e) common means intercoupling said first and said second means and responsive thereto for simultaneously imparting the rotational and the axial movement to the workpiece, said common means being independently controlled by said first and said second means for independent axial and rotational movement of the workpiece, said common means including first and second pairs of rollers positioned on opposite sides of a central axis to grip a workpiece for angular rotation and axial translation along the central axis;

first and second sets of bevel gears, said first set of bevel gears being operatively connected with said first pair of rollers and said second set of bevel gears being operatively connected with said second set of rollers, a first bevel gear of each of said first and second sets of bevel gears being connected with said first means and a second bevel gear of each said first and second sets of bevel gears being connected with said second means, said first bevel gears being coaxial with one of said paris of rollers and said second bevel gears of said first and second sets of bevel gears; and, shafts coupling said rollers and said bevel gears to rotate said bevel gears about their own axes and to revolve said bevel gears about the axis of the workpiece.

* * * * *